(12) United States Patent
Binev et al.

(10) Patent No.: US 7,617,905 B2
(45) Date of Patent: Nov. 17, 2009

(54) HYDRAULIC STEERING DEVICE

(75) Inventors: Binio Binev, Haibach (DE); Udo Herrmann, Johannesberg (DE)

(73) Assignee: Linde Material Handling GmbH, Aschaffenburg (DE)

(*) Notice: Subject to any disclaimer, the term of this patent is extended or adjusted under 35 U.S.C. 154(b) by 382 days.

(21) Appl. No.: 11/636,375

(22) Filed: Dec. 8, 2006

(65) Prior Publication Data

US 2007/0144817 A1 Jun. 28, 2007

(30) Foreign Application Priority Data

Dec. 12, 2005 (DE) .................. 10 2005 059 237

(51) Int. Cl.
*B62D 5/09* (2006.01)
(52) U.S. Cl. ..................... 180/403; 180/422
(58) Field of Classification Search ................ 180/403, 180/417, 421, 422
See application file for complete search history.

(56) References Cited

U.S. PATENT DOCUMENTS

| | | | | |
|---|---|---|---|---|
| 2,671,673 A | * | 3/1954 | Benson ........................ 280/477 |
| 4,254,968 A | * | 3/1981 | DelVecchio ................. 280/477 |
| 4,657,276 A | * | 4/1987 | Hamerl ....................... 280/512 |
| 5,114,170 A | * | 5/1992 | Lanni et al. ................. 280/477 |
| 5,215,158 A | * | 6/1993 | Pedersen .................... 180/403 |
| 5,941,551 A | * | 8/1999 | Harman et al. ............. 280/494 |
| 6,179,318 B1 | * | 1/2001 | Howard ...................... 280/477 |
| 2003/0218313 A1 | * | 11/2003 | Beaudoin .................... 280/477 |

* cited by examiner

*Primary Examiner*—Kevin Hurley
(74) *Attorney, Agent, or Firm*—The Webb Law Firm

(57) ABSTRACT

A hydraulic steering device (1) of a mobile machine, in particular of an industrial truck, includes a steering angle transmitter (2) in mechanically functional communication with a steering valve (4). As a function of the actuation of the steering angle transmitter (2), the steering valve (4) controls the connection of a steering drive (13) with a pressure fluid source (6) and a reservoir (11). To vary the translation ratio of the steering device in a simple manner, a bypass device (20) is operationally associated with the steering drive (13). By activation of the bypass device, the quantity of pressure fluid delivered from the pressure fluid source (6) to the steering drive (13) can be diverted to a reservoir (11).

12 Claims, 1 Drawing Sheet

HYDRAULIC STEERING DEVICE

CROSS REFERENCE TO RELATED APPLICATION

This application claims priority to German Application No. 10 2005 059 237.6, filed Dec. 12, 2005, which application is herein incorporated by reference in its entirety.

BACKGROUND OF THE INVENTION

1. Field of the Invention

This invention relates to a hydraulic steering device of a mobile machine, such as an industrial truck. The steering device has a steering angle transmitter in a mechanically functional connection with a steering valve. As a function of the actuation of the steering angle transmitter, the steering valve controls the connection of a steering drive with a pressure fluid source and a reservoir.

Hydraulic steering devices in which a steering valve that is activated mechanically by a steering angle transmitter (such as a steering wheel, for example) controls the actuation of a steering drive (such as a steering cylinder, for example) that is functionally connected to a steered axle with the steered wheels are used in mobile machines, such as fork-lift trucks. In steering devices of this type, the steering angle sensor is in a mechanical drive connection with the steering valve by means of a steering shaft.

On steering devices of this type, the translation ratio, i.e., the number of revolutions of the steering angle sensor to actuate the steering drive from a first stop to a second stop, must be specified by the mechanically functional connection between the steering valve and the steering angle transmitter.

However, on mobile machines, in particular industrial trucks, it is desirable for the steering device to have a high translation ratio when the machine is stopped or traveling at low speed so that the steering drive can be actuated from the first stop to the second stop by means of a low number of revolutions of the steering angle transmitter. This permits the cargo-carrying capacity of the mobile machine to be increased.

At a high speed of travel of the mobile machine, it is desirable for the steering device to have a low translation ratio, i.e., a high number of revolutions of the steering angle transmitter is required to actuate the steering drive from the first stop to the second stop. AT high speeds of travel, it is thereby possible to avoid abrupt deflections of the steering drive when the steering angle sensor is activated. Thus, at high speeds of travel, the safety of the mobile machine and, in particular, the stability of the vehicle to prevent lateral tipping can be increased when the steering angle transmitter is activated.

It is an object of the invention to provide a hydrostatic steering device of the general type described above but in which the translation ratio of the steering device can be varied in a simple manner.

SUMMARY OF THE INVENTION

In one embodiment, a bypass device is associated with the steering drive. By means of the bypass device, the quantity of pressure fluid that is delivered from the pressure fluid source to the steering drive can be diverted to a reservoir. With a bypass device of this type, a portion of the quantity of pressure fluid that is delivered from the pressure fluid source to the steering drive can be diverted to the reservoir. As a result of which, the steering translation ratio can be reduced. With a bypass device of this type, the translation ratio of the steering device can thus be varied in a simple manner.

In one preferred embodiment of the invention, the bypass device is a valve device, in particular in the form of a control valve that acts as a throttle in intermediate positions, and has a closed position and an open position. At the maximum translation ratio, the valve device actuates the steering device into the closed position and, to reduce the translation ratio of the steering device, can be actuated toward the open position. With a valve device of this type, an actuation into the open position can be achieved with little construction effort. To reduce the translation ratio of the steering device, the quantity of pressure fluid delivered from the pressure fluid source to the steering drive is made to flow partly to the reservoir.

It is advantageous if there is a stop valve, such as a check valve, that opens toward the reservoir when the valve device is in the open position.

In one realization of the steering drive in the form of a dual-action steering cylinder with two control pressure chambers, a bypass device can be associated with each control pressure chamber.

However, a low degree of construction effort and a reduction in the amount of space required can be achieved if, as in one advantageous development of the invention, the bypass device is in communication on the input side with the output of a shuttle valve device. The shuttle valve device is in communication on the input side with a first pressure fluid line leading from the steering valve to the steering drive and a second pressure fluid line leading from the steering valve to the steering drive. By means of the shuttle valve device, it is a simple matter with only one bypass device in a steering drive that is realized in the form of a dual-action steering cylinder with two control pressure chambers to divert a quantity of the pressure fluid delivered by the pressure fluid source to the corresponding control pressure chamber of the steering drive to the reservoir.

A simple construction with a simple control of the bypass device becomes possible if the bypass device can be actuated electrically.

The valve device in this case is advantageously realized so that it can be actuated in the direction of the flow position by means of an electromagnet, such as a proportional magnet. As a result of which, a simple actuation can be achieved with little construction effort.

If the valve device, as in one embodiment of the invention, can be actuated toward the closed position by means of a spring, a high level of operational safety of the steering device can be achieved. This is because, in the event of a failure of the electrical actuation, the maximum translation ratio of the steering device can be achieved by the actuation of the bypass device into the closed position.

Particular advantages can be achieved if the bypass device, as in one development of the invention, is in functional communication with an electronic control device for actuation. With an electronic control device, the bypass device can be actuated in a simple manner to modify the translation ratio of the steering device as a function of defined vehicle conditions and operating conditions of the mobile machine.

The electronic control device can be in functional communication with at least one sensor device that determines the vehicle status of the mobile machine, such as a sensor device that measures the speed of travel of the mobile machine and/or a sensor device that detects the cornering of the mobile machine, for example, a steering angle sensor that is associated with the steering drive. The translation ratio of the steering device can thus be reduced in a simple manner as a function of the speed of travel and/or the cornering of the mobile machine, whereby a high degree of vehicle stability, in particular to prevent lateral tipping, is achieved at a high speed of travel and/or during cornering of the mobile machine.

BRIEF DESCRIPTION OF THE DRAWING

Additional advantages and details of the invention are explained in greater detail below on the basis of the exemplary embodiment that is illustrated in the accompanying schematic FIGURE showing a hydraulic system of an industrial truck having a hydraulic steering device of the invention.

DESCRIPTION OF THE PREFERRED EMBODIMENT

Figure 1:
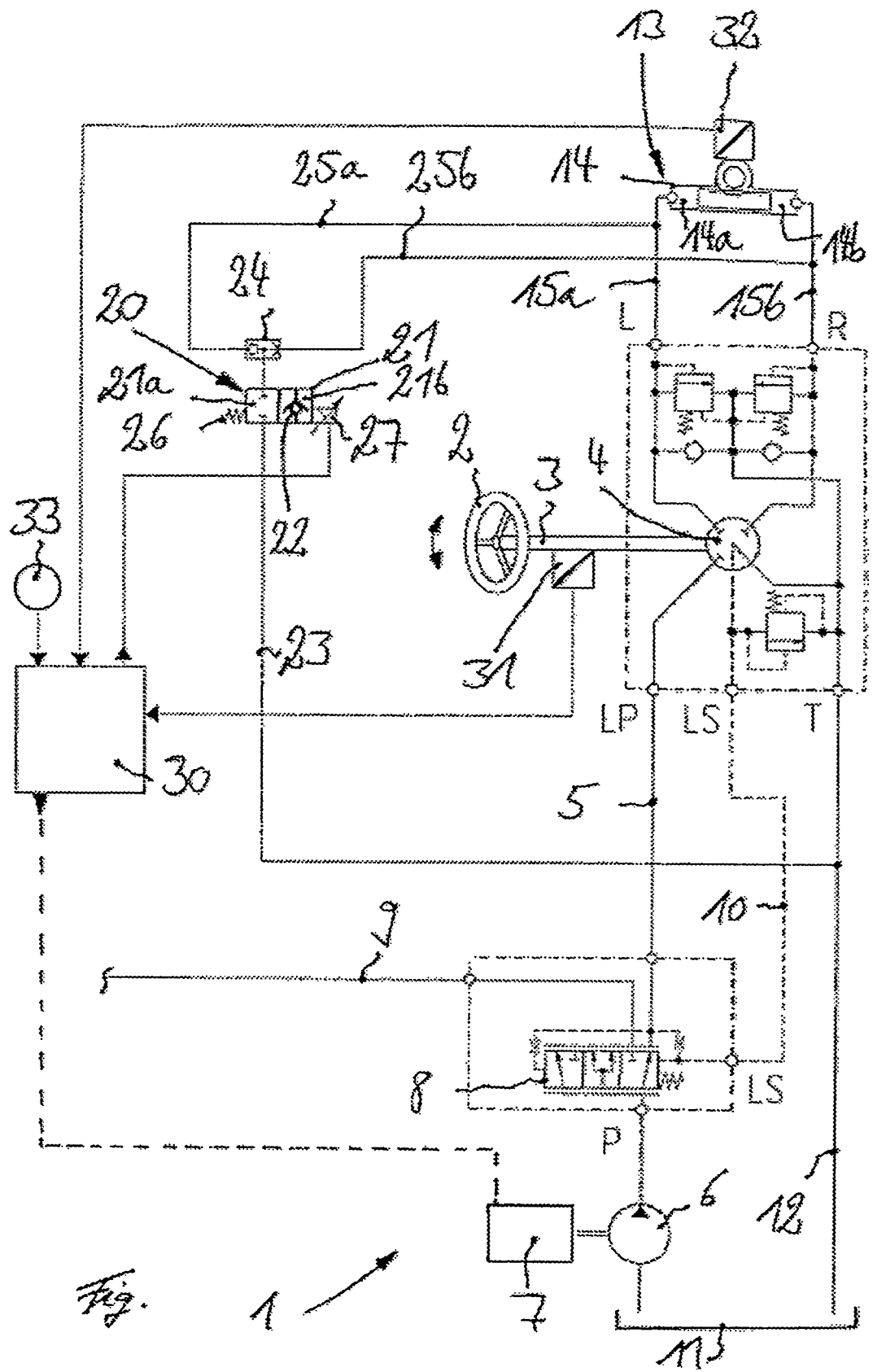

The FIGURE shows a hydraulic steering device 1 of a mobile machine, for example of an industrial truck that is realized in the form of a fork-lift truck. The steering device 1 has a steering angle transmitter 2, for example a steering wheel, which is in a functional mechanical drive connection with a steering valve 4 by means of a steering shaft 3. The steering valve 4 is shown enclosed by a dotted line and is realized in the form of a conventional orbitrol hydraulic steering unit. The steering valve 4 is in communication with a delivery line 5 of a pressure fluid source 6 that is realized in the form of a pump, which is in a drive connection with a drive machine 7, for example an electric motor. Located in the delivery line 5 is a priority valve 8, to the output side of which is connected a delivery branch line 9 that leads to a lifting drive, a tilting drive, and an auxiliary drive of the industrial truck, whereby a priority supply of the steering device 1 is ensured as the result of an actuation of the priority valve 8 by the load pressure of the steering device 1 conducted in a load pressure signal line 10. The steering valve 4 is also connected to a reservoir line 12 that leads to a reservoir 11. The steering device 1 also has a steering drive 13, which is realized, for example, in the form of a dual-acting steering cylinder 14, which is located on a steering axle of the industrial truck and is functionally connected with the steered wheels in any conventional manner. The steering cylinder 14 is realized in the form of a dual-acting steering cylinder and has a first control pressure chamber 14a and a second control pressure chamber 14b. The first control pressure chamber 14a is in communication with the steering valve 4 by means of a first pressure fluid line 15a and the second control pressure chamber 14b is in communication with the steering valve 4 by means of a second pressure fluid line 15b.

The invention teaches that a bypass device 20 is associated with the steering device 1, by means of which the quantity of pressure fluid delivered from the pressure fluid source 6 to the steering drive 13 can be diverted to the reservoir 11.

The bypass device 20 is realized in the form of a valve device 21, in particular in the form of a control valve that exerts a throttling action in intermediate positions. The valve device 21 has a closed position 21a and an open position 21b. There is a stop valve 22, such as a check valve, that opens toward the reservoir 11 when the valve device 21 is in the open position 21b.

The bypass device 20, which is realized in the form of a valve device 21, is located in a connecting line 23 that leads from the output of a shuttle valve device 24 to the reservoir line 12. On the input side, the shuttle valve device 24 is in communication by means of a first connecting line 25a with the first pressure fluid line 15a that leads from the steering valve 4 to the steering drive 13, and by means of a second connecting line 25b with the second pressure fluid line 15b that leads from the steering valve 4 to the steering drive 13.

The bypass device 20 that is realized in the form of a valve device 21 can be actuated electrically. For this purpose, the valve device 21 can be actuated by means of an electromagnet 27, such as a proportional magnet, toward the open position 21b. The valve device 21 can be actuated in the direction of the closed position 21a by means of a spring 26.

For the actuation of the bypass device 20 that is realized in the form of a valve device 21, the electromagnet 27 is functionally connected on the output side with an electronic control device 30. On the input side, the electronic control device 30 is functionally connected with a sensor device 31 that is located on the steering shaft 3. The electronic control device 30 is also in functional communication on the input side with a sensor device 32 that detects the cornering of the mobile machine and can be realized, for example, in the form of a steering angle sensor that is located on the steering drive 13. The electronic control device 30 is also connected on the input side with a sensor device 33 that measures the speed of travel of the mobile machine. On the output side, the electronic control device 30 is also in communication with the drive machine 7.

In the event of an activation of the steering angle transmitter 2 detected by the sensor device 31, the drive machine 7 is actuated by the control device 30, as a result of which pressure fluid is delivered from the pressure fluid source 6 into the delivery line 5.

If the bypass device 20 is not actuated, the valve device 21 is in the closed position 21a. The pressure fluid delivered from the pressure fluid source 6 thus flows in its entirety via the pressure fluid line 15a or 15b, depending on the actuation of the steering valve 4, to the steering drive 13. As a result of which, the steering device 1 has the highest translation ratio and the steering drive 13 can be actuated from a first stop to a second stop with a lower number of revolutions of the steering angle transmitter 2 (e.g., steering wheel).

To reduce the translation ratio of the steering device 1 (i.e., to increase the number of revolutions of the steering wheel to actuate the steering drive 13 from a first stop to a second stop), the bypass device 20, which is realized in the form of a valve device 21, is actuated by means of the electronic control device 30 in the direction of the open position 21b. As a result of which, a portion of the quantity of pressure fluid that is delivered from the pressure fluid source 6 to the steering drive 13 when the steering valve 4 is activated can be diverted to the reservoir 11.

By means of the electronic control device 30, the bypass device 20 can thereby be controlled as a function of the speed of travel of the industrial truck measured by means of the sensor device 33, and/or by means of the sensor device 32 as a function of the steering angle that occurs during cornering, and, thus, as a function of the radius of the curve. When the vehicle is stopped or traveling at low speed, the bypass device 20 is not actuated and is in the closed position 21a. As the speed of travel increases and/or during cornering with an increasing steering angle, the bypass device 20 is moved by an actuation of the electromagnet 27 toward the open position 21b. When the industrial truck is stopped or traveling at low speeds, as a result of the bypass device 20 which is moved into the closed position 21a, there is thus a high translation ratio of the steering device 1. As a result of which, the industrial truck has a high cargo-carrying capacity. Depending upon the vehicle condition of the industrial truck, in particular a high speed of travel and/or a small radius of the curve during cornering, the translation ratio of the steering device 1 can be easily reduced to increase the stability of the vehicle, i.e., to prevent lateral tipping, by actuating the bypass device 20 toward the open position 21*b*.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydraulic steering device of a mobile machine, comprising:
    a steering angle transmitter functionally connected with a steering valve, wherein the steering valve controls a connection of a steering drive with a pressure fluid source and a reservoir as a function of activation of the steering angle transmitter; and
    a bypass device functionally connected with the steering drive, wherein a quantity of pressure fluid delivered from the pressure fluid source to the steering drive can be diverted to said reservoir by the bypass device,
    wherein, for actuation, the bypass device is functionally connected with an electronic control device.

2. The hydraulic steering device as recited in claim 1, wherein the bypass device comprises a control valve that performs a throttling action in intermediate positions and has a closed position and an open position, and wherein the control valve is actuated at a maximum translation ratio of a steering device into the closed position by a valve closing actuator and can be actuated toward the open position by a valve opening actuator to reduce the translation ratio of the steering device.

3. The hydraulic steering device as recited in claim 2, including a stop valve functionally connected to the control valve that opens toward the reservoir in the open position of the control valve.

4. The hydraulic steering device as recited in claim 1, wherein the bypass device is connected on an input side with an output of a shuttle valve device, and wherein the shuttle valve device is connected on an input side with a first pressure fluid line that leads from the steering valve to the steering drive and a second pressure fluid line that leads from the steering valve to the steering drive.

5. The hydraulic steering device as recited in claim 1, wherein the bypass device is electronically actuated by the electronic control device.

6. The hydraulic steering device as recited in claim 2, wherein wherein the valve opening actuator is an electromagnet.

7. The hydraulic steering device as recited in claim 2, wherein wherein the valve closing actuator is a spring.

8. The hydraulic steering device as recited in claim 1, wherein the electronic control device is functionally connected on an input side with at least one sensor device that measures a vehicle status.

9. The hydraulic steering device as recited in claim 8, wherein the sensor device is selected from the group consisting of a sensor device that detects a speed of travel of the mobile machine and a sensor device that detects cornering of the mobile machine.

10. The hydraulic steering device as recited in claim 9, wherein the sensor device is a steering angle sensor that is associated with the steering drive.

11. A hydraulic steering device of a mobile machine, comprising:
    a steering angle transmitter functionally connected with a steering valve, wherein the steering valve controls a connection of a steering drive with a pressure fluid source and a reservoir as a function of activation of the steering angle transmitter; and
    a bypass device functionally connected with the steering drive, wherein a quantity of pressure fluid delivered from the pressure fluid source to the steering drive can be diverted to said reservoir by the bypass device,
    wherein the bypass device comprises a control valve that performs a throttling action in intermediate positions and has a closed position and an open position, and wherein the control valve is actuated at a maximum translation ratio of a steering device into the closed position by a valve closing actuator and can be actuated toward the open position by a valve opening actuator to reduce the translation ratio of the steering device, and
    wherein the bypass device is connected on an input side with an output of a shuttle valve device, and wherein the shuttle valve device is connected on an input side with a first pressure fluid line that leads from the steering valve to the steering drive and a second pressure fluid line that leads from the steering valve to the steering drive.

12. The hydraulic steering device as recited in claim 2, wherein the bypass device is electronically actuated by the electronic control device.

* * * * *

UNITED STATES PATENT AND TRADEMARK OFFICE
CERTIFICATE OF CORRECTION

PATENT NO. : 7,617,905 B2
APPLICATION NO. : 11/636375
DATED : November 17, 2009
INVENTOR(S) : Binev et al.

It is certified that error appears in the above-identified patent and that said Letters Patent is hereby corrected as shown below:

Column 6, Line 2, "wherein wherein the valve" should read
-- wherein the valve --

Column 6, Line 5, "wherein wherein the valve" should read
-- wherein the valve --

Signed and Sealed this

Sixteenth Day of March, 2010

David J. Kappos
*Director of the United States Patent and Trademark Office*